US011875810B1

United States Patent
Helwani et al.

(10) Patent No.: US 11,875,810 B1
(45) Date of Patent: Jan. 16, 2024

(54) ECHO CANCELLATION USING NEURAL NETWORKS FOR ENVIRONMENTS WITH UNSYNCHRONIZED DEVICES FOR AUDIO CAPTURE AND RENDERING

(71) Applicant: Amazon Technologies, Inc., Seattle, WA (US)

(72) Inventors: Karim Helwani, Mountain View, CA (US); Emmanouil Theodosis, Somerville, MA (US)

(73) Assignee: Amazon Technologies, Inc., Seattle, WA (US)

(*) Notice: Subject to any disclaimer, the term of this patent is extended or adjusted under 35 U.S.C. 154(b) by 281 days.

(21) Appl. No.: 17/489,538

(22) Filed: Sep. 29, 2021

(51) Int. Cl.
*G10L 21/02* (2013.01)
*G10L 21/0208* (2013.01)
*H04M 9/08* (2006.01)
*G06N 3/045* (2023.01)
*G10L 21/0216* (2013.01)

(52) U.S. Cl.
CPC .......... *G10L 21/0208* (2013.01); *G06N 3/045* (2023.01); *H04M 9/082* (2013.01); *G10L 2021/02082* (2013.01); *G10L 2021/02166* (2013.01)

(58) Field of Classification Search
CPC ....... G10L 21/0208; G10L 2021/02082; G10L 2021/02166; G10L 21/0364; G10L 25/78; H04M 9/082; G05B 13/042; H04N 13/178
USPC ........................................................ 704/226
See application file for complete search history.

(56) References Cited

U.S. PATENT DOCUMENTS

| | | | |
|---|---|---|---|
| 8,275,120 B2 | 9/2012 | Stokes, III et al. | |
| 8,280,037 B2 | 10/2012 | Takada | |
| 8,811,601 B2 | 8/2014 | Mohammad et al. | |
| 9,451,078 B2 | 9/2016 | Yang et al. | |
| 9,936,290 B2 | 4/2018 | Mohammad et al. | |

(Continued)

FOREIGN PATENT DOCUMENTS

| | | | |
|---|---|---|---|
| CN | 105929693 A | * | 9/2016 |
| WO | WO-2020087293 A1 | * | 5/2020 |

OTHER PUBLICATIONS

Simone Scardapane, et al., "Complex-valued Neural Networks with Non-parametric Activation Functions," Preprint Submitted to IEEE Trans. on Emerging Topics in Computational Intelligence, arXiv:1802.08026v1 [cs.NE], Feb. 22, 2018, pp. 1-12.

(Continued)

*Primary Examiner* — Md S Elahee
(74) *Attorney, Agent, or Firm* — Robert C. Kowert; Kowert, Hood, Munyon, Rankin & Goetzel, P.C.

(57) ABSTRACT

At a first layer of an echo canceler, a first compensation for a first set of properties of output of an audio capture device of a first communication environment is applied. The first set of properties includes a property resulting from a difference in clock speeds of an audio capture device and an audio rendering device of the first communication environment. At a second layer of the echo canceler, at which output of the first layer is received, a second compensation for a second set of properties of the output of the first layer is applied. The second set of properties includes an echo. Applying the compensations comprises modifying neural network weights. Output of the second layer is transmitted to a second communication environment.

20 Claims, 10 Drawing Sheets

(56) References Cited

U.S. PATENT DOCUMENTS

| | | | | |
|---|---|---|---|---|
| 2007/0021958 A1* | 1/2007 | Visser | ................... | G10L 25/78 |
| | | | | 704/226 |
| 2012/0209601 A1* | 8/2012 | Jing | ................... | G10L 21/0364 |
| | | | | 704/226 |
| 2023/0051960 A1* | 2/2023 | Sonneveldt | .......... | H04N 13/178 |

OTHER PUBLICATIONS

Joshua Bassey, et al., "A Survey of Complex-Valued Neural Networks," arXiv:2101.12249v1 [stat.ML], Jan. 28, 2021, pp. 1-15.

Patrick Virtue, et al., "Better Than Real: Complex-Valued Neural Nets for MRI Fingerprinting," arXiv:1707.00070v1 [cs.CV], Jul. 1, 2017, pp. 1-5.

Wolfgang Klippel, et al., "Loudspeaker Nonlinearities—Causes, Parameters, Symptoms," presented at the 119th Convention of the Audio Engineering Society, Convention Paper 6584, Oct. 2005, pp. 1-69.

MoritzWolter, et al., "Complex Gated Recurrent Neural Networks," 32nd Conference on Neural Information Processing Systems (NeurIPS 2018), Montréal, Canada, pp. 1-11.

Andy M. Sarroff, "Complex Neural Networks for Audio," Thesis Submitted to the Faculty in partial fulfillment of the requirements for the degree of Doctor of Philosophy in Computer Science, Dartmouth College, May 2018, pp. 1-114.

* cited by examiner

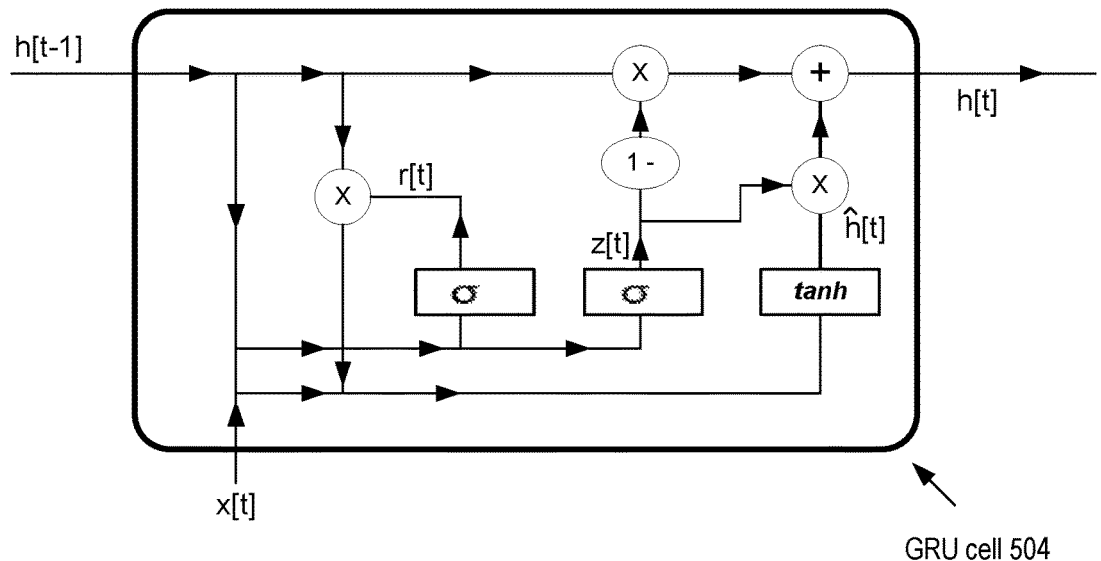

GRU equations 506:
$$z_t = \sigma_g(W_z x_t + U_z h_{t-1} + b_z)$$
$$r_t = \sigma_g(W_r x_t + U_r h_{t-1} + b_r)$$
$$\hat{h}_t = \phi_h(W_h x_t + U_h(r_t \odot h_{t-1}) + b_h)$$
$$h_t = (1 - z_t) \odot h_{t-1} + z_t \odot \hat{h}_t$$

Cardioid activation function 508:
$$\phi_h(x) = \frac{1}{2}(1 + \cos(\angle x))x$$

Siglog activation function 510:
$$\mathrm{siglog}(x; r, c) = \phi_h(x; r, c) = \frac{x}{c + \frac{1}{r}|x|}$$

Sigmoid activation function 512:
$$\sigma_{\mathrm{mod\ sigmoid}}(x) = \sigma(\alpha \mathcal{R}(x) + \beta \mathcal{I}(x))$$

Gradient descent update function 514 using Wirtinger calculus:
$$z_{n+1} = z_n - \mu * \frac{\partial \mathcal{L}}{\partial z^*}$$

*FIG. 5*

At a communication environment CE1, an NMEC (e.g., part of a participant P1's laptop's or phone's video conferencing application) dynamically learns parameters indicative of the local acoustic environment during a given communication session CS1, and metrics are captured indicating how quickly the NMEC is able to converge on the parameters to cancel echoes  701

The learned parameters and metrics are saved, e.g., at a communication facilitation service (CFS) of a cloud provider network  704

Participant P1 takes part in other communication sessions at other CEs, such as CE2, CE3, etc.; in each case, new parameters are learned and new metrics are collected and saved  707

During a subsequent communication session CS2 in which P1 also happens to be in CE1, the NMEC starts off with the saved parameters which were learned earlier at CE1, thus potentially shortening the learning interval further  710

Metrics from the different CEs can be analyzed and provided upon request to NMEC clients, and can also be used to recommend improvements to local acoustic environments at the different CEs  713

*FIG. 7*

ECHO CANCELLATION USING NEURAL NETWORKS FOR ENVIRONMENTS WITH UNSYNCHRONIZED DEVICES FOR AUDIO CAPTURE AND RENDERING

BACKGROUND

In recent years, more and more business meetings and social interactions are being conducted using remote interaction technologies instead of in person. In some cases, for example, several participants in a business meeting, more than one of whom may be present in the same conference room, may each use respective video-conferencing applications running on their laptops or other mobile computing devices to take part in the meeting. Depending on the audio rendering devices (e.g., speakers) being used, their locations with respect to the audio capture devices (e.g., microphones) being used, and the acoustics of the meeting room, echoes of the audio received from the remote participants can end up being included in the outbound audio signal representing the speech of the local participants. If the echoes are not canceled or suppressed, they can degrade the quality of the interactions. In some cases, the operating clock frequencies of audio capture devices being used in a given communication environment may not be perfectly synchronized with those of the audio rendering devices, which can impact the ability of traditional echo cancellation techniques.

BRIEF DESCRIPTION OF DRAWINGS

FIG. 5 illustrates aspects of a gated recurrent unit (GRU) which may be employed at the neural networks of one or more layers of a neural network-based echo canceler, according to at least some embodiments.

FIG. 7 is a flow diagram illustrating aspects of operations that may be performed with respect to metrics and re-use of learned parameters of neural network-based multi-layer echo cancelers, according to at least some embodiments.

Figure 1:
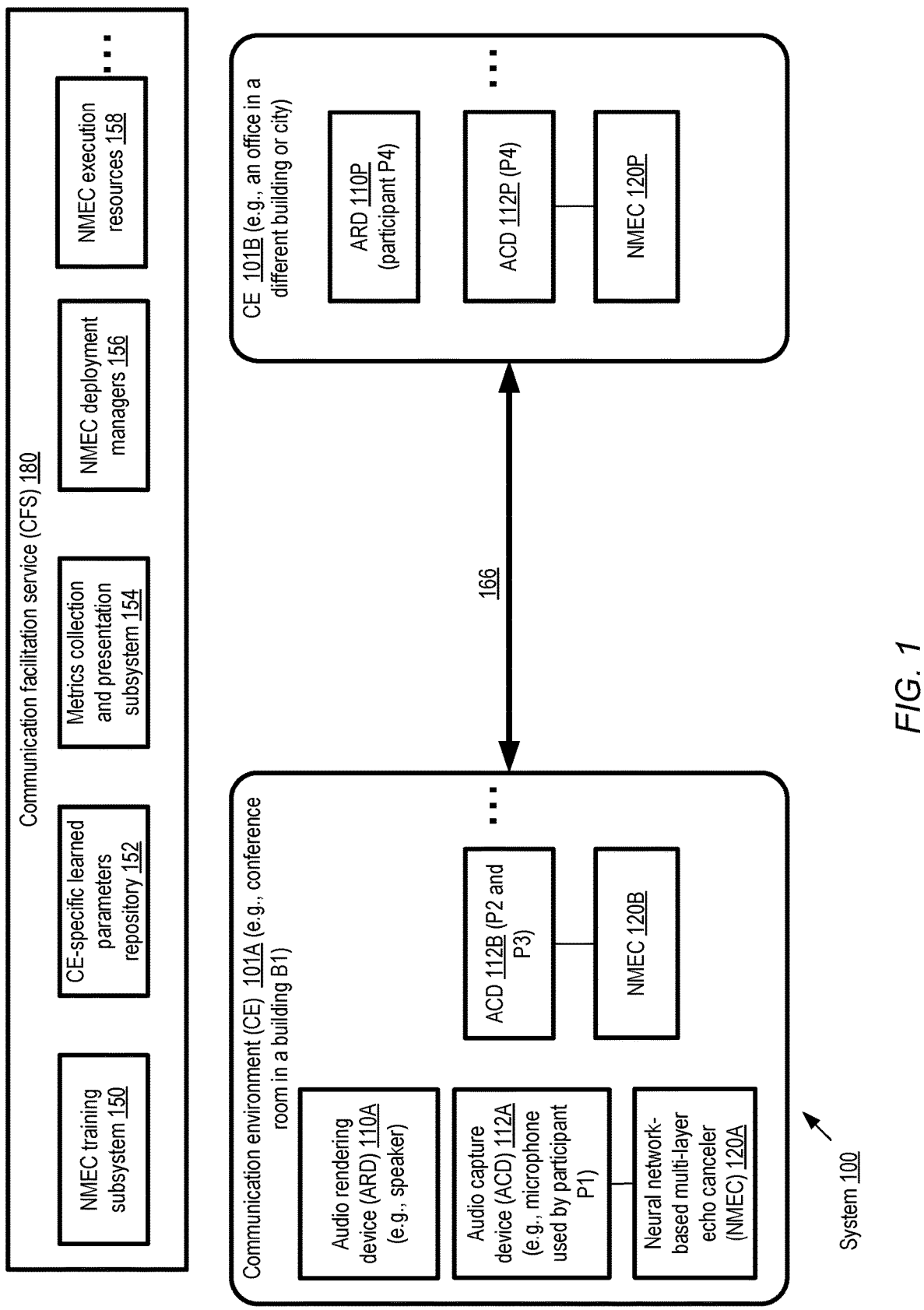
FIG. 1 illustrates an example system environment in which respective neural network-based multi-layer echo cancelers may be employed during communication sessions, according to according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

DETAILED DESCRIPTION

The present disclosure relates to methods and apparatus for enhanced echo cancellation techniques implemented using neural networks that can dynamically learn to compensate for non-linear as well as linear effects represented in captured audio as part of a communication session such as a teleconference. In addition to the core problem of echoes, which can be expected in communication environments in which physically separated speakers and microphones are used, some of the effects for which compensations are applied can arise for other reasons. For example, non-linear effects can arise as a result of the fact that in practice, there can often be a skew (a lack of synchronization) in the clocks used for independent operating devices such as microphones and speakers employed in the communication sessions. Non-linearity in the audio reproduction performed by the speakers involved (that is, not all portions of the audio spectrum represented in its input signal may be reproduced equally well by a given speaker) can also be dealt with using the enhanced echo cancellation methodology described.

The proposed techniques can be employed at a variety of computing devices employed for communication which includes two-way audio. Neural network-based multi-layer echo cancellers (NMECs) may be included, for example, as part of video-conferencing software application installations, or as part of the software deployed for voice-driven personal assistant devices. At a high level, an NMEC can comprise at least two cascaded layers (layers arranged in series): a first layer responsible for compensating for non-linear effects introduced into the signals generated at an audio capture device (ACD) such as a microphone, and a second layer which consumes the output generated by the first layer and utilizes a linear model of a pathway between the audio rendering device (ARD) and an ACD to cancel an echo. The first layer can be referred to as a non-linear effects handler (NLEH), while the second layer can be referred to as a linear effects handler (LEH). Each of the layers can be implemented using recurrent complex-valued neural networks, i.e., neural networks whose input (e.g., audio signals represented in the frequency domain) and learned weights are expressed as complex numbers, and complex activation functions are used. Such complex-values neural networks (also referred to simply as complex neural networks) can take frequency-band amplitude and phase information of audio signals into account concurrently in a manner more closely related to the way the human auditory system processes sound than conventional neural networks.

An NMEC can be trained initially, e.g., at a provider network or cloud computing environment, using training data gathered and/or synthesized by the NMEC vendor (which may in some cases be the operator of the provider network). Training data representative of a variety of acoustic environments (e.g., several different conference rooms, offices, homes etc.) may be collected and/or synthesized for the initial training. During this initial training, a default set of parameters that represent a reasonable starting point for cancelling echoes are learned, based upon the acoustic environment conditions represented in the training data. The component elements of the NMEC neural networks are structured in such a way that the NMEC in effect learns to continue learning after deployment; that is, the parameters used to compensate for echoes and other acoustic distortions continue to be modified in the deployment environment based on the local acoustic condition. The NMEC is able to converge quickly on the appropriate set of parameters for the acoustics at any given communication environment.

As one skilled in the art will appreciate in light of this disclosure, certain embodiments may be capable of achieving various advantages, including some or all of the following: (a) improving the quality of audio transmitted between remote participants of communication sessions in which ACDs and ARDs may not be synchronized with one another in terms of operating clocks, e.g., by rapidly converging on the parameters needed to compensate for location-specific acoustic distortions and echoes, and/or (b) reducing the amount of time taken to test and validate echo cancelers prior to deployment, e.g., relative to scenarios in which conventional echo cancelers with adaptive digital filters are used.

According to at least some embodiments, a system may include one or more computing devices. The devices may include program instructions that when executed at the one or more computing devices obtain, as input at a neural network-based multi-layer echo canceler (NMEC) comprising a first layer which includes a non-linear effects handler and a second layer which includes a linear effects handler, (a) output of a first microphone in a first communication environment comprising one or more microphones and one or more speakers, and (b) a reference signal received at the first communication environment from a second communication environment and directed to a first speaker of the one or more speakers. In various embodiments, the non-linear effects handler may generate a first output obtained at least in part by applying a first learned compensation for a first set of properties of the output of the first microphone. The first set of properties may, for example, include (a) a first non-linearity resulting from a clock skew (difference in clock speeds or frequencies) between the first speaker and the first microphone, and (b) a second non-linearity in an audio reproduction capability of the first speaker. Applying the first learned compensation may comprise modifying one or more weights of a first neural network based at least in part on processing of the reference signal and the output of the first microphone in at least some embodiments. The first set of properties that are compensated in the first layer may include a lack of alignment of the representation of the echoed signal with respect to the reference signal received from the second communication environment—e.g., in the reference signal, the peak amplitude during a given time interval may correspond to a frequency f1, while in the echo captured at the microphone, the peak amplitude during that same interval may correspond to a slightly different frequency (f1+delta) or (f1−delta). If an attempt to cancel an echo, e.g., by in effect "subtracting" the echo, assumes identical frequencies, the cancellation may not be as effective as it would be if the difference in clock frequencies were taken into account and compensated. Similar alignment problems may arise because of the non-linear manner in which the first speaker reproduces audio received from the remote communication environment—e.g., the tone that happened to be the loudest in the audio signal received from the remote communication environment at a given point of time may not be the loudest in the audio generated by the first speaker for that same point of time.

The output of the non-linear effects handler may be included in the input provided to the linear effects handler in various embodiments, e.g., along with the reference signal. At the linear effects handler, a second output may be obtained at least in part by applying a second learned compensation for a second set of properties of the output of the non-linear effects handler. The second set of properties may for example include a first echo resulting from capturing audio output of the first speaker at the first microphone. Applying the second compensation may comprise utilizing, at a second neural network, a learned linear model of an acoustic path between the first speaker and the first microphone in at least some embodiments. The linear model may assume that corresponding to a signal S rendered at the first speaker, a signal that can be represented as a linear function of S (e.g., aS+b) is captured at the first microphone due to the acoustic environment of the first communication environment, so the echo can be modeled as such a linear function. The second output, produced at the linear effects handler, may be transmitted to the second communication environment. Note that in some cases, an NMEC may be used at multiple communication environments involved in a given communication session, with echoes being compensated for at each of the environments. In some embodiments in which multiple audio capture devices are being used for a given communication session (e.g., a respective microphone being used by each of several meeting participants, where the participants may be distributed among several different communication environments) a respective NMEC may be employed for each audio capture device. Note that while an NMEC may cancel echoes in various embodiments, it may not perform echo suppression as such. Echo suppression prevents individuals participating in a communication session from hearing their own voices retransmitted from a remote communication environment by muting or attenuating the signals representing those voices in the audio received from the remote communication environment, while echo cancellation prevents echoes from being included in the signals sent from the local communication environment to the remote communication environment.

In various embodiments, at least some of the neural networks at the first layer (the non-linear effects handler or NLEH) and/or the second layer (the linear effects handler or LEH) of the NMEC may comprise a recurrent neural network or sub-network, which in turn may include one or more gated recurrent units (GRUs). In at least some embodiments, at least some of the learned weights of one or more of the neural networks, as well as a representation of the input, may be expressed as complex numbers. Input audio signals representing waveforms in the time domain may be transformed into frequency domain representations expressed using complex numbers in various embodiments before processing the input at an NMEC. Before the output of the NMEC is transmitted to a remote communication environment, an inverse transformation (a frequency domain to time domain transformation) may be applied to express the output signal in the time domain. Complex activation functions, such as complex cardioid functions and/or so-called siglog functions, may be employed at one or more of the NMES's neural networks in some embodiments. In one embodiment, one or more of the layers of the NMEC may comprise a fully-connected layer of artificial neurons at which a convolution operation is performed with respect to a representation of a reference signal obtained from a remote communication environment. In some embodiments, the NMEC may be executed as part of the software of a video conferencing application, an audio conferencing application, or a voice-driven personal assistant device.

According to one embodiment, an initial set of parameters of an NMEC may be learned using a training data set prior to deployment of the NMEC. After deployment of the NMEC at a communication environment, a first convergence metric indicative of a time taken by the NMEC to adapt the initial set of parameters to that communication environment during a given communication session (e.g., a meeting) may be captured or collected. Adapting the initial set of parameters may result in computing a second set of parameters, including at least one modified weight of a neural network of one of the NMEC layers. After the NMEC is deployed at another communication environment, a second convergence metric indicative of a time taken by the NMEC to adapt to that other communication environment during a different communication session may also be captured or collected. The collected convergence metrics (or a subset thereof) may be provided via programmatic interfaces, e.g., to clients of a communication facilitation service (CFS) of a provider network. In some embodiments, a query interface may be supported by the CFS, enabling clients to indicate selection criteria such as locations (e.g., communication environments such as conference rooms or buildings from which the convergence metrics were collected) or time periods (time intervals or specific communication sessions during which the convergence metrics were collected) in queries for convergence metrics. In response to such queries, a subset of the collected metrics which satisfy the query parameters may be selected and provided to the client.

The weights and parameters learned dynamically by an NMEC may be saved in some embodiments at persistent storage, e.g., at a CFS, and re-used as needed. For example, consider a scenario in which a particular employee of an organization typically attends videoconferences several times a week in different conference rooms CR1, CR2 and CR3 within an office campus. The employee may download videoconferencing software (comprising an NMEC) from the CFS to a laptop, and then use the laptop for the videoconferences. The first time that the videoconferencing software is used at CR1 for a communication session such as a videoconference, the NMEC of the software may learn weights and parameters (e.g., modifications of the parameters learned during training of the neural networks of NMEC) that are based on the acoustic environment of CR1 during the communication session. This first set of parameters may be stored at persistent storage, along with metadata indicating where the NMEC was being used when the parameters were learned (CR1 in this example). Similarly, respective sets of parameters may be learned in CR2 and CR3, and stored in persistent storage. Later, when the employee returns to CR1 for another videoconference or communication session which may also involve the same set of communication environments, the saved parameters which were learned in CR1 may be downloaded automatically as part of an initialization procedure of the videoconferencing software (during which the software is able to determine that the location at which it is running is CR1) and re-used, thereby enabling the NMEC to shorten the time it takes to converge to parameters for the communication environment of CR1. Similarly, saved parameters for CR2 and CR3 may also be re-used as needed in at least some embodiments.

In at least some embodiments, an NMEC may be developed using resources of a cloud provider network, e.g., at a communication facilitation service which provides various types of software and tools for managing meetings and the like. A cloud provider network (sometimes referred to simply as a "cloud" or as a "provider network") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services. In various embodiments, NMECs may be downloaded (e.g., as part of conferencing software) from a provider network and run at client devices such as laptops, desktops, phones and other devices, or installed as part of software shipped with devices such as voice-driven personal assistant devices. In at least one embodiment, at least a portion of an NMEC may be executed in real time at provider network resources instead of being run at client devices.

FIG. 1 illustrates an example system environment in which respective neural network-based multi-layer echo cancelers may be employed during communication sessions, according to according to at least some embodiments. As shown, system 100 may comprise resources and artifacts of a communication facilitation service (CFS) 180 from which neural network-based multi-layer echo cancelers (NMECs) of the kind introduced above may be provided for use at a variety of communication environments (CEs) including CE 101A and CE 101B. During a given communication session, CE 101 (for example, a conference room within a building in some city) may comprise at least one audio rendering device (ARD), such as ARD 110A, and one or more audio capture devices (ACDs) such as ACDs 112A and 112B. Similarly, CE 102 (for example, an office in a building in the same city or a different city) may also comprise one or more ARDs such as ARD 110P, and one or more ACDs such as ACD 112P. A given ARD in a CE may, for example, comprise a speaker incorporated within a client device such as a laptop, or a standalone speaker device that is part of the standard equipment of the CE. A given ACD may comprise, for example, a built-in microphone of a client device, or a microphone included within a headset. The clocks used at ARDs and the ACDs (e.g., for sampling the audio) in a given CE may not necessarily be perfectly synchronized with each other, even if they are nominally supposed to be synchronized. An ACD's clock frequency may thus differ from an ARD's clock frequency. Such clock skews may result from minor deviations in the behavior of hardware chips from their nominal or advertised behavior, for example.

In some cases, several different participants in a communication session may use the same ARD or the same ACD. For example, all the participants in CE 101A may be using a single ARD 110A for listening to audio received via communication channels 166 (e.g., Internet Protocol (IP) network connections, cellular connections provided by telecommunication companies, and the like) from CE 101B. In some cases, a single participant may be using a given ACD, while in other cases multiple participants sitting close to each other may share a given ACD. ACD 112A may be used by a participant P1, for example, at CE 101A, while ACD 112B may be used by participants P2 and P3. At CE 101B, ARD 110P and ACD 112P may be used by the same participant P4. Participants at other CEs, not shown in FIG. 1, may also participate in the communication session with the participants in CEs 101A and 101n.

In the embodiment shown in FIG. 1, resources at NMEC training subsystem 150 of CFS 180 may be utilized to perform initial training of NMECs that are eventually used at the CEs 101 after being deployed by NMEC deployment managers 156. A given NMEC may be executed as part of the processing of audio signals picked up at a given ACD, and the processed version of the audio signal (from which effects such as echoes have been removed) may be sent from one CE to another via the communication channels 166. For example, NMEC 120A may process input captured at ACD 112A, NMEC 120B may process input captured at ACD 112B, and NMEC 120P may process input captured at ACD 112P in the depicted scenario. In at least some embodiments, the NMECs may be deployed and executed as part of videoconferencing or audio conferencing applications used by the participants in the communication sessions.

A given NMEC 120 may comprise at least two cascaded stages or layers in the depicted embodiment, with each stage comprising one or more neural networks. The first layer may be referred to as a non-linear effects handler (NLEH), may use learned parameters of its neural networks to compensate for non-linear effects introduced into the output of an ACD 112, such as non-linearity in the sound reproduction capabilities of the ARDs in the local CE, as well as a non-linearity resulting from the clock skew (difference in clock speed/frequency) between an ARD and the ACD. The output of the ACD, as well as a reference signal representing audio sent to the ARD from the remote CE, may be converted from the time domain to the frequency domain before being processed at the NMEC in various embodiments. The second layer, referred to as a linear effects handler (LEH) may use a linear model of the acoustic path between an ARD and the ACD to compensate for, or cancel, the echo from the transformed representation of the ACD output generated by the NLEH. The output produced by the LEH associated with a given ACD at CE 101A may be transmitted (e.g., after transforming it back into the time domain) to the CE 110 via channels 166 in the depicted embodiment. Additional details regarding the structure of the neural networks used at the NMECs are provided below.

According to at least some embodiments, a given NMEC may be used in several different CEs, e.g., as the client device within which the NMEC is implemented/executed is moved from one location to another by the device owner and utilized for different communication sessions. The first time that an NMEC is used at a given CE, it may modify its parameters/weights to adapt to the acoustic environment at that CE. The parameters may be saved at a CE-specific learned parameters repository 152 of the CFS in the depicted embodiment. Later, if and when the NMEC is employed again at the same CE, some or all of the saved parameters may be downloaded and re-used, thereby further shortening (or decreasing to near-zero) the time taken by the NMEC to adapt to its acoustic environment.

In some embodiments, metrics indicating how long it takes for an NMEC to adapt its parameters to each CE in which it is used may be collected and stored at the CFS, e.g., at the metrics collection and presentation subsystem 154. Echo loss return enhancement (ERLE) metrics, indicating the additional signal loss applied by an NMEC, may be captured in some embodiments for various communication sessions and also stored at the CFS. In some embodiments, participants in the communication sessions in which NMECs are utilized may be asked to rate the extent to which echo was perceived as a problem during the communication sessions (e.g., as part of an overall rating for audio quality), and such ratings may also be stored at the CFS. Some or all of the metrics may be provided via programmatic interfaces from the metrics collection and presentation subsystem, e.g., to the data scientists responsible for designing/developing the NMECs as well as to the end users of the NMECs if desired.

In at least one embodiment, NMEC execution resources 158 may be used to execute NMECs as part of some communication sessions. For example, reference signals and audio signals captured at ACDs during a communication session may be transmitted via the CFS to remote CEs, and echo cancellation may be performed at the CFS during transit of the captured audio signals to the remote CEs.

Figure 2:
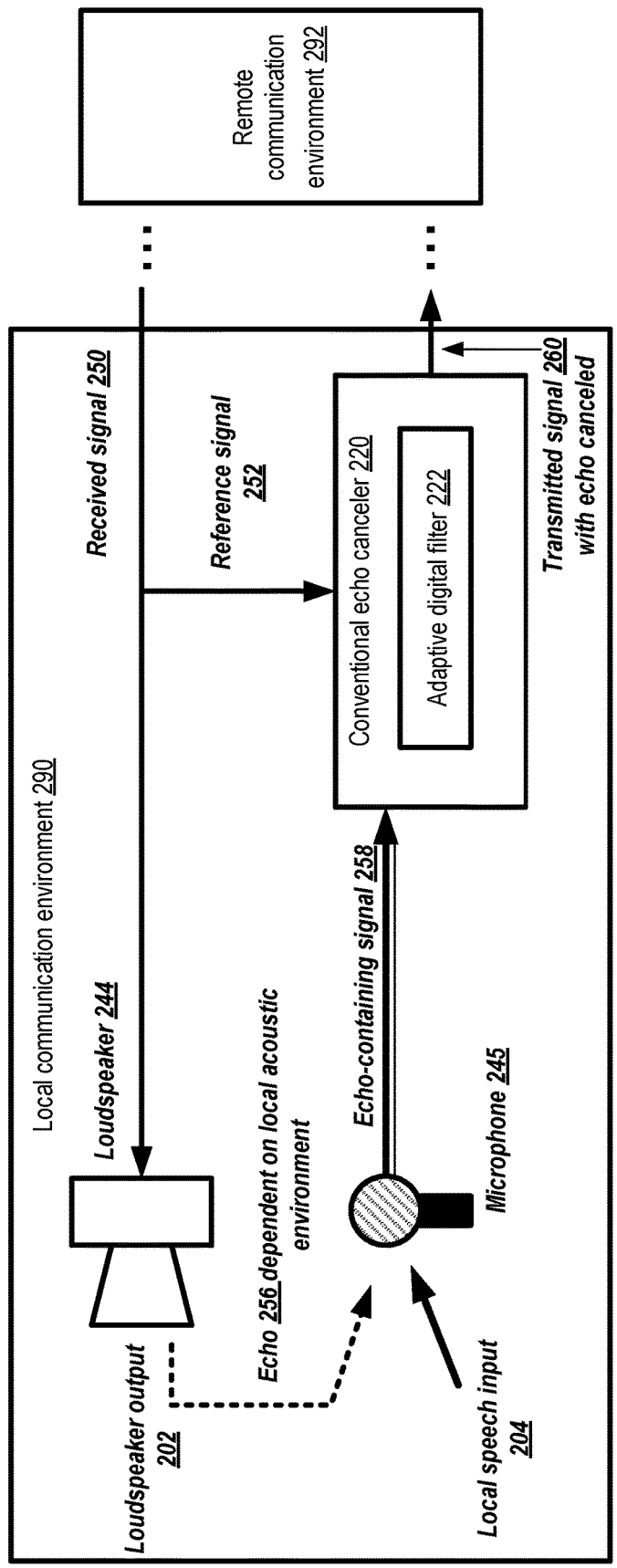
FIG. 2 illustrates example problems that may arise when using some conventional echo cancellation techniques, according to at least some embodiments.

FIG. 2 illustrates example problems that may arise when using some conventional echo cancellation techniques, according to at least some embodiments. In the scenario shown in FIG. 2, a received signal 250 carrying audio from a remote communication environment 292 is played or rendered at a loudspeaker 244 within a local communication environment 290, producing loudspeaker output 202. A microphone 245 captures local speech input 204 as well as an echo 256 dependent on the local acoustic environment (e.g., how far away the loudspeaker is from the microphone, how much sound reflects off walls in the local communication environment, and so on).

An echo-containing signal 258 produced at the microphone is consumed as input, along with a reference signal 252 corresponding to the received signal, at a conventional echo canceler 220 comprising an adaptive digital filter 222. The digital adaptive filter in effect attempts to identify representations of the reference signal (i.e., the echo of the audio received from the remote communication environment) within the echo-containing signal, and then subtracts or removes the identified representation, resulting ideally in a transmitted signal 260 with the echo canceled.

Unfortunately, the technique used at the conventional echo canceler may suffer from several problems. First, the "subtraction" of the echo may depend on an assumption that the operating or sampling frequencies of the microphone and the received signal played at the loudspeaker are identical; in practice such exact synchronization is rare, as the clock used for sampling the input at the microphone may be skewed with respect to the clock used for the received signal. This type of clock skew results in one type of non-linear effect which the conventional echo canceler may not be able to deal with easily. To try to overcome the lack of synchronization due to clock skews, in some implementations timestamps or other messages may have to be exchanged between the loudspeaker and the microphone repeatedly during a given communication session. This type of timestamp exchange may take a non-trivial amount of time (thus increasing the delay before the echo is successfully or near-successfully canceled), and may also require a communication pathway between the microphone and the loudspeaker. Control over entire the audio rendering/capture subsystem, which may be required for such communications, may not be possible in environments in which the loudspeakers and the microphones are not part of the same devices and may have been manufactured independently of one another. Another potential problem is that conventional echo cancelers may not be able to compensate for non-linearity in the reproduction of sound at the loudspeakers—for example, some parts of the audio spectrum may be reproduced with higher or lower fidelity relative to others at the loudspeaker. As a result, the echo's audio profile (which tones are louder than others etc.) may differ from the audio profile of the sound included in the received signal, while the conventional echo canceler assumes the profiles to be the same.

A solution to these problems faced by conventional echo cancelers may be to utilize neural network-based echo cancelers of the kind introduced above. The neural networks may be structured in such a way that they are able to compensate for both non-linear and linear effects, and do not require the exchange of timestamps for clock synchronization in various embodiments.

Figure 3:
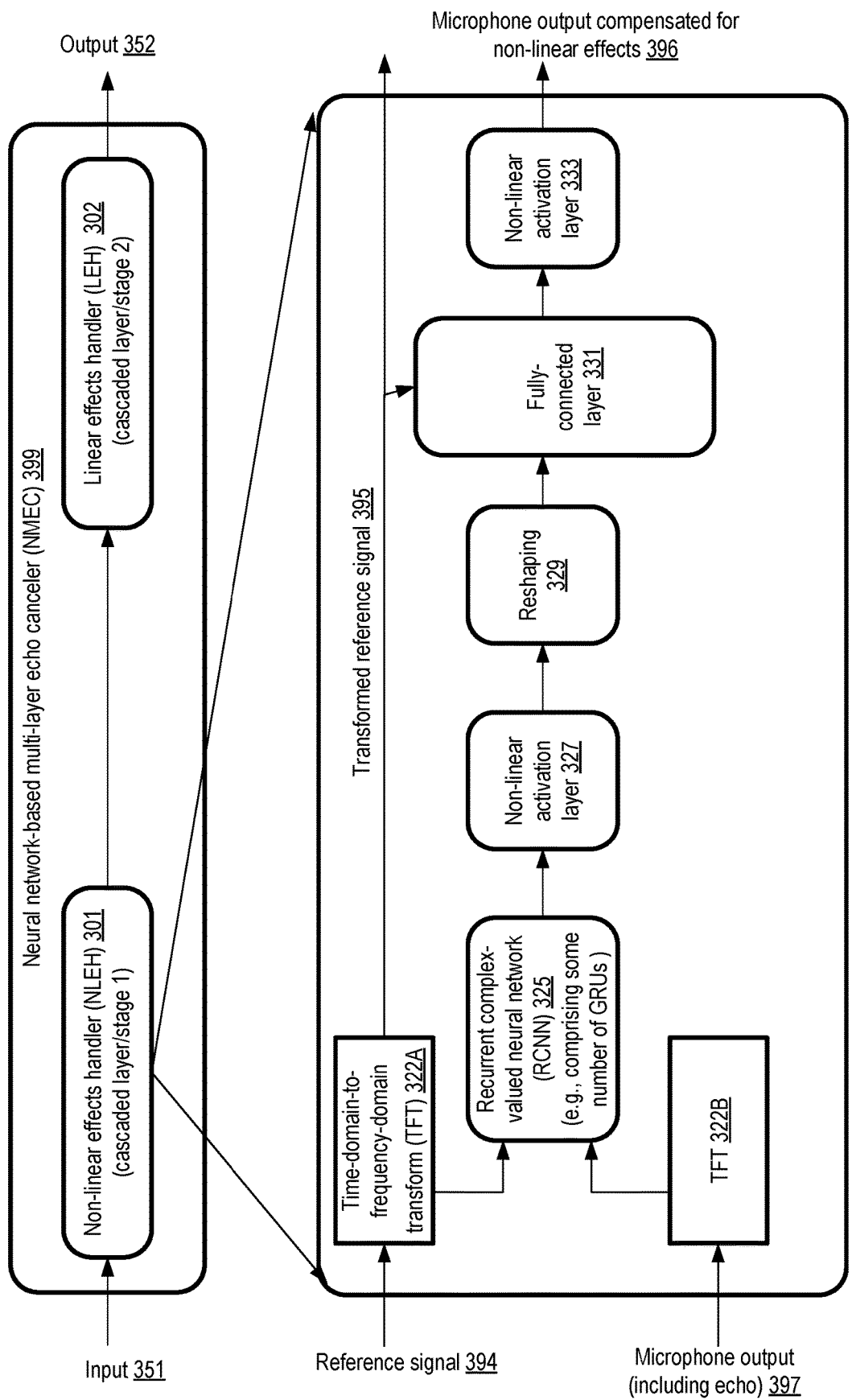
FIG. 3 illustrates aspects of an example non-linear effects handler layer of a neural network-based echo canceler, according to at least some embodiments.

FIG. 3 illustrates aspects of an example non-linear effects handler layer of a neural network-based echo canceler, according to at least some embodiments. In the depicted embodiment, an NMEC 399 may comprise two cascaded subcomponents or layers, including a non-linear effects handler (NLEH) 301 followed by a linear effects handler (LEH) 302. Input 351 of the NMEC may comprise signals captured in the local communication environment, comprising microphone output 397 and a reference signal 394. The input 351 may be processed at the NLEH; the output produced by the neural networks of the NLEH may comprise microphone output compensated for non-linear effects 396. The NLEH output (and the reference signal) may be provided as input to the LEH 302, where additional neural networks may be used to produce the final output 352 to be sent to the remote communication environment.

The reference signal 394 may be transformed from the time domain to the frequency domain, e.g., using a Short-time Fourier transform (STFT) at a time-domain-to-frequency-domain transform (TFT) subcomponent 322A in the depicted embodiment. Similarly, the microphone output 397, which contains the echo, may also be transformed to the frequency domain using TFT subcomponent 322B. The Short-time Fourier transform is a Fourier-related transform used to determine the sinusoidal frequency and phase content of local sections of a signal as it changes over time. In some implementations, the procedure for computing STFTs can include dividing a longer time signal into shorter segments of equal length and then computing the Fourier transform separately on each shorter segment, thereby revealing the Fourier spectrum on each shorter segment. Other techniques for obtaining the frequency domain representation may be used in other embodiments. The frequency and phase contents obtained at a TFT subcomponent 322 may be represented as the real and imaginary components of complex numbers in at least some embodiments.

The transformed reference signal and microphone output may both be provided as input to a recurrent complex-valued neural network (RCNN) 325 in the depicted embodiment, which may for example comprise some number of gated recurrent units (also referred to as GRU cells) of the kind depicted in FIG. 5. Output of the RCNN 325 may then be passed through a non-linear activation layer 327 before being reshaped and consumed (after reshaping 329) as input by a fully-connected layer 331. The fully-connected layer 331 may also receive the transformed representation of the reference signal as input. A convolution operation may be performed at the fully connected layer 331 with respect to the reshaped output of the non-linear activation layer and the reference signal. Output of the fully-connected layer 331 may be passed through another non-linear activation layer 333. The output of the non-linear activation layer 333, comprising the microphone output to which dynamically learned compensations for non-linear effects have been applied, may be sent as input to the LEH in various embodiments.

Figure 4:
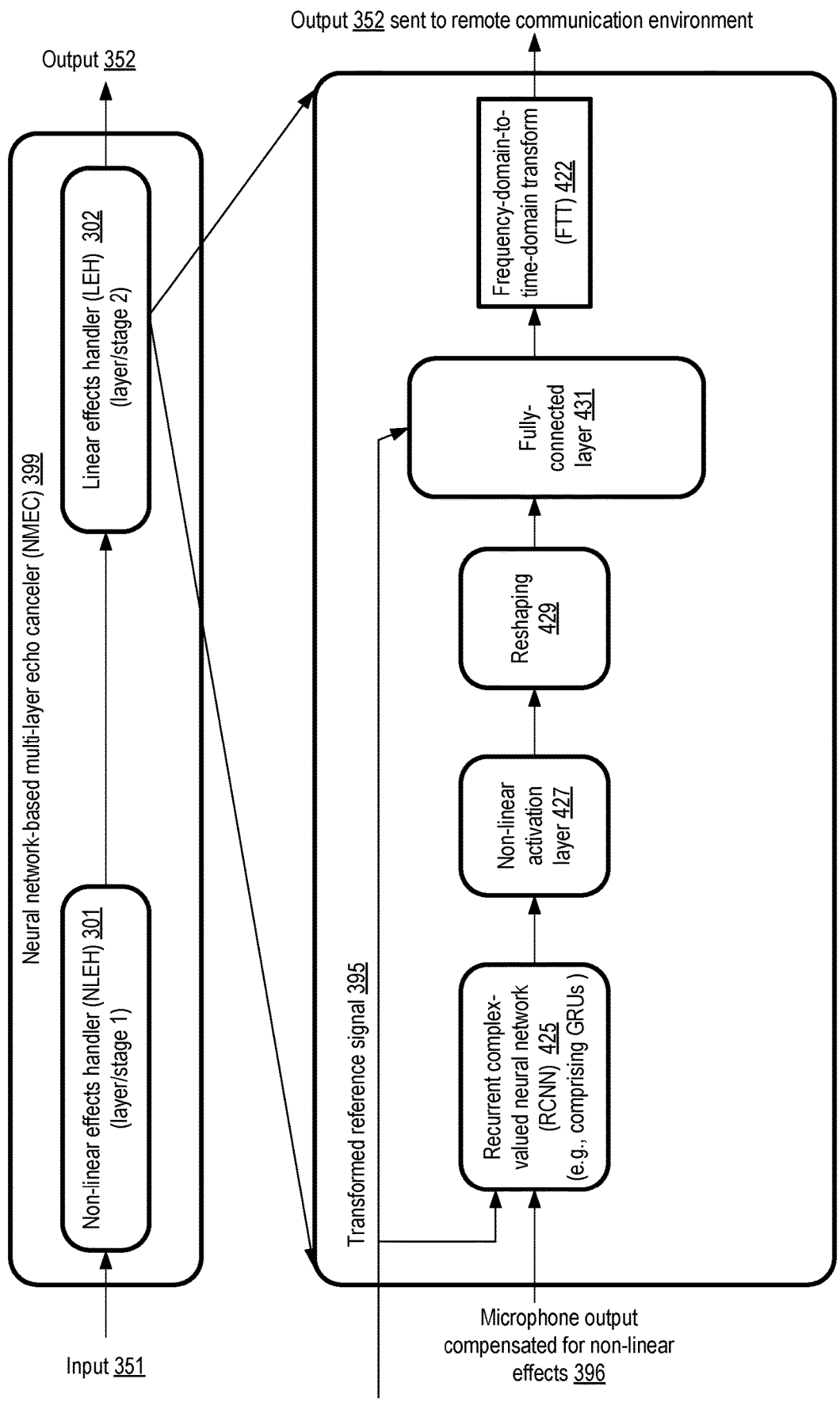
FIG. 4 illustrates aspects of an example linear effects handler layer of a neural network-based echo canceler, according to at least some embodiments.

FIG. 4 illustrates aspects of an example linear effects handler layer of a neural network-based echo canceler, according to at least some embodiments. The linear effects handler (LEH) layer may implement a similar neural architecture to that of the NLEH in at least some embodiments, as indicated by the similarities between FIG. 3 and FIG. 4. In some implementations, the NLEH and the LEH may utilize respective blocks of the same neural network-based framework, with some components that are present in the NLEH being nullified or removed from the LEH.

In the embodiment shown in FIG. 4, the LEH may comprise an RCNN 425, which may also comprise some number of GRUs. Input consumed by the RCNN 425 may include the output 396 of the NLEH, as well as the transformed version 395 of the reference signal. Output of the RCNN 425 may be passed through a nonlinear activation layer 427, reshaped, and provided as input (after reshaping 429) to a fully-connected layer 431. At the fully-connected layer 431, a convolution operation may be performed between the transformed reference signal 395 and the reshaped output of the non-linear activation layer 427. The output of the fully-connected layer may be transformed back to the time domain at frequency-domain-to-time-domain transform (FTT) subunit 422 (e.g., using an inverse STFT), and sent to the remote communication environment in the depicted embodiment.

FIG. 5 illustrates aspects of a gated recurrent unit (GRU) which may be employed at the neural networks of one or more layers of a neural network-based echo canceler, according to at least some embodiments. A given GRU cell 504 may generate an internal representation $h[t]$ of an input signal $x[t]$ based on the internal representation $h[t-1]$ generated in the previous time interval and learned weights (represented by weight matrices W and U) and biases in accordance with a set of GRU equations 506 in the depicted embodiment. The RCNNs 325 and 425 of FIG. 3 and FIG. 4 may comprise one or more layers of GRU cells similar to GRU cell 504 in various embodiments.

As mentioned earlier, the input signals received at the RCNNs may be represented as complex numbers, which enables audio signals to be processed in a manner more closely related to the way the human auditory system processes sound than the manner in which audio signals can be processed at conventional real-valued neural networks. Because the inputs are complex, in at least some embodiments, complex activation functions may be used, such as the complex cardioid activation function 508 or the siglog activation function 510 (in which r and c respectively represent scale and steepness constants). For the update and reset gates of the GRU, a sigmoid activation function 512 may be utilized in at least some embodiments. The Wirtinger calculus may be used for gradient descent updates in some embodiments, with a gradient descent update function similar to function 514 shown in FIG. 5. In at least one embodiment, at least some of the non-linear activation layers 327, 333 and 427 shown in FIG. 3 and FIG. 4 may also use the complex cardioid and/or siglog activation functions.

In one example implementation, the input time signal received at an NMEC may comprise a windowed sequence of 320 samples with an overlap rate of 50% (i.e., 160 new samples may be received in each window). The output of the STFT may be 257 complex sub-bands in such an implementation. The RCNN may comprise multiple GRU layers with input of dimensionality 2*257 (e.g., 257 elements each from the reference and the microphone output in the case of the NLEH), and the output may comprise 257 dimensions. The convolution operation applied on the transformed reference signal may not be memory-less, so multiple time lags of the RCNN output may be buffered before the convolution in some implementations. The RCNN may generate 257 coefficients for every time step, e.g., in a vector W, and L such vectors may be buffered. For each of the sub-bands, m complex coefficients may be arranged in a convolution matrix, and multiplied with the buffered reference signal in the same sub-band at the fully-connected layer. Similar computations may be performed at both the NLEH and the LEH in such an implementation.

In some embodiments, the NLEH and the LEH may first be trained independently of each other, e.g., at a CFS similar to CFS 180 of FIG. 1, and then trained jointly. In the independent training phase, the NLEH may be trained, e.g., using training data captured from several communication environments and/or synthesized at the CFS, to adapt to purely nonlinear effects such as clock-skew based effects and loudspeaker nonlinearities, while the LEH may be trained to adapt to linear effects represented in a linear model of the loudspeaker-microphone acoustic pathway. The loss function used during the training for the NLEH by itself in various embodiments may measure how well the NLEH is able to eliminate non-linear effects or distortions within audio captured at a communication environment using a microphone when a speaker with an unsynchronized clock is being used in the communication environment. The loss function used during the training of the LEH itself may measure how well the LEH is able to eliminate echo in a scenario in which the speaker and the microphone are synchronized and the speaker's sound reproductions do not have non-linear distortions in at least some embodiments. In the joint training phase, the NLEH and the LEH may be trained as a cascaded set of subcomponents to produce output from which both linear and non-linear distortions have been eliminated in such embodiments. It is noted that in some embodiments, neural network architectures and components other than those shown in FIG. 3, FIG. 4 and/or FIG. 5 may be employed at NMECs. For example, recurrent neural networks that do not use GRUs may be utilized in some embodiments, or activation functions other than those shown in FIG. 5 may be used. In one embodiment, cascaded machine learning models that do not use neural networks may be used for handling non-linear and linear effects respectively at a machine learning-based echo canceler.

Figure 6:
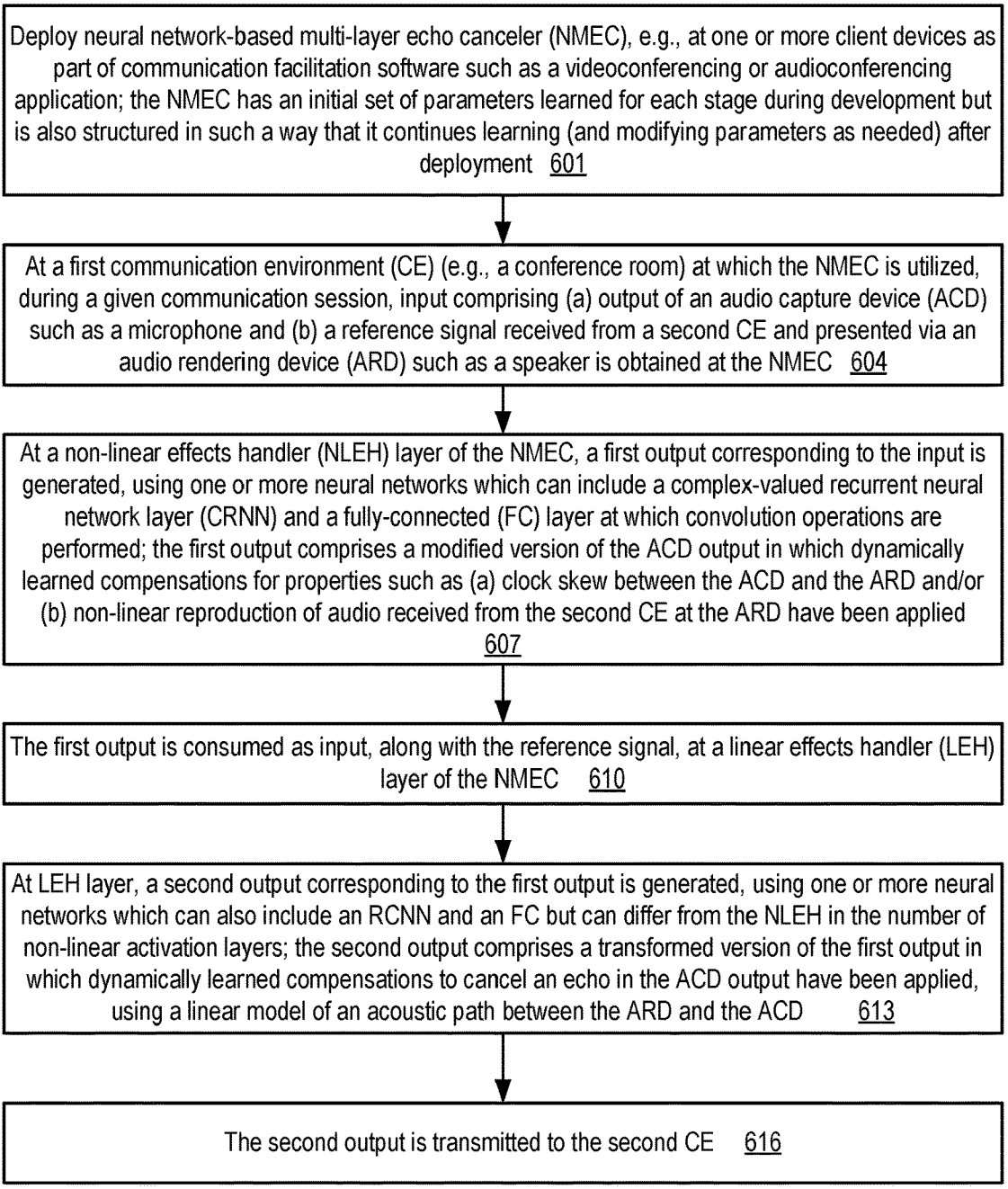
FIG. 6 is a flow diagram illustrating aspects of operations that may be performed at a neural network-based multi-layer echo canceler, according to at least some embodiments.

FIG. 6 is a flow diagram illustrating aspects of operations that may be performed at a neural network-based multi-layer echo canceler, according to at least some embodiments. As shown in element 601, an NMEC of the kind described above may be deployed at one or more client devices (e.g., phones, tablets, laptops, desktops etc.) as part of communication facilitation software such as a videoconferencing or audioconferencing application. When first deployed or installed, an NMEC may come with an initial set of internal parameters or weights learned during an initial phase of training at a communication facilitation service similar to CFS 180 of FIG. 1. However, because of the internal structure of the NMEC (similar to the structure indicated in FIG. 3 and FIG. 4) and the manner in which information contained in the reference signal is processed, the NMEC may continue to fine-tune internal parameters after deployment; in effect, during initial training the NMEC may learn how to continue learning post-deployment.

At a first communication environment (CE) such as a conference room at which the NMEC is utilized during a given communication session, input comprising output of an audio capture device (ACD) such as a microphone and a reference signal received from a second CE and presented via an audio rendering device (ARD) such as a microphone may be obtained at the NMEC (element 604).

At a non-linear effects handler (NLEH) layer of the NMEC, a first output corresponding to that NMEC input may be generated in various embodiments (element 607) using one or more neural networks. The neural networks of the NLEH can include a complex-valued recurrent neural network (CRNN) and a fully connected layer at which convolution operations are performed with respect to a transformed version (e.g., transformed from the time domain to the frequency domain) of the reference signal. The first output may represent a modified version of the ACD output in which dynamically learned compensations for properties such as (a) clock skew between the ACD and the ARD and (b) non-linear reproduction of audio received at the ARD from the second CE have been applied. The compensations may be applied by modifying one or more learned parameters of the NLEH's neural networks in various embodiments.

The output of the NLEH may be consumed as input at a linear effects handler (LEH) layer of the NMEC, along with a transformed version of the reference signal (element 610). The LEH may also comprise one or more neural networks in some embodiments, which may also include a CRNN and a fully-connected layer. The LEH may differ from the NLEH in the number of At the LEH, a second output corresponding to the first output may be generated in various embodiments (element 613). The second output may comprise a transformed version of the first output, in which dynamically learned compensations for properties including an echo are applied to the first output. A linear model of an acoustic path between the ARD and the ACD may be employed at the LEH to apply its compensations in at least some embodiments. The second output may be transmitted to the second CE in various embodiments (element 616).

FIG. 7 is a flow diagram illustrating aspects of operations that may be performed with respect to metrics and re-use of learned parameters of neural network-based multi-layer echo cancelers, according to at least some embodiments. At a communication environment CE1, an NMEC (e.g., part of a participant P1's laptop or phone's video conferencing application) dynamically adapts or learns parameters indicative of the local acoustic environment during a given communication session CS1 conducted with one or more remote communication environments (element 701). One or more metrics may be captured from the NMEC, indicating for example how long it took for the NMEC to adapt to the environment of CE1.

The learned parameters and metrics may be saved, e.g., at persistent storage at a communication facilitation service (CFS) of a provider network at which the NMEC was designed and developed (element 704). Depending on the device within which the NMEC is executed, in some cases the learned parameters and/or metrics may be stored at local persistent storage instead of or in addition to being transmitted to a CFS.

Participant P1 may eventually transport the device containing the NMEC to other CEs, such as CE2, CE3, etc., where the NMEC may be used during other communication sessions in which P1 also participates (element 707). At each CE, new parameters may be learned by the NMEC, and new convergence metrics may be collected in various embodiments. The parameters and metrics from each CE may be added to the collection of saved parameters and metrics. In some embodiments, information about the respective locations (e.g., conference room names, building names, or Global Positioning System (GPS) coordinates) at which each set of parameters was learned may be stored along with the parameters themselves.

For a subsequent communication session CS2 in which P1 also participates from CE1, the NMEC may obtain the parameters which were learned earlier in CE1, and may re-use those parameters, e.g., as the starting set of NMEC parameters during initialization of the application of which the NMEC is a part (element 710). Location information of CE1 may be sent in a query to the database of saved parameters in one embodiment, and parameters learned earlier at CS1 may be retrieved from the database in response to the query. Such re-use of the learned parameters may further shorten the time (the dynamic learning interval before parameter convergence) it takes for the NMEC to adapt to an acoustic environment.

NMEC metrics collected from the different CEs may be analyzed at the CFS (e.g., to help generate improved versions of the NMEC software) and/or provided to NMEC clients or users upon request in some embodiments (element 713). In some cases, the metrics may be used to recommend improvements to local communication environments—e.g., to send a recommendation to mute one or more speakers, or move a microphone closer to a participant in a communication session.

It is noted that in various embodiments, some of the operations shown in FIG. 6 and/or FIG. 7 may be implemented in a different order than that shown in the figure, or may be performed in parallel rather than sequentially. Some of the operations shown in FIG. 6 and/or FIG. 7 may not be required in one or more implementations.

Figure 8:
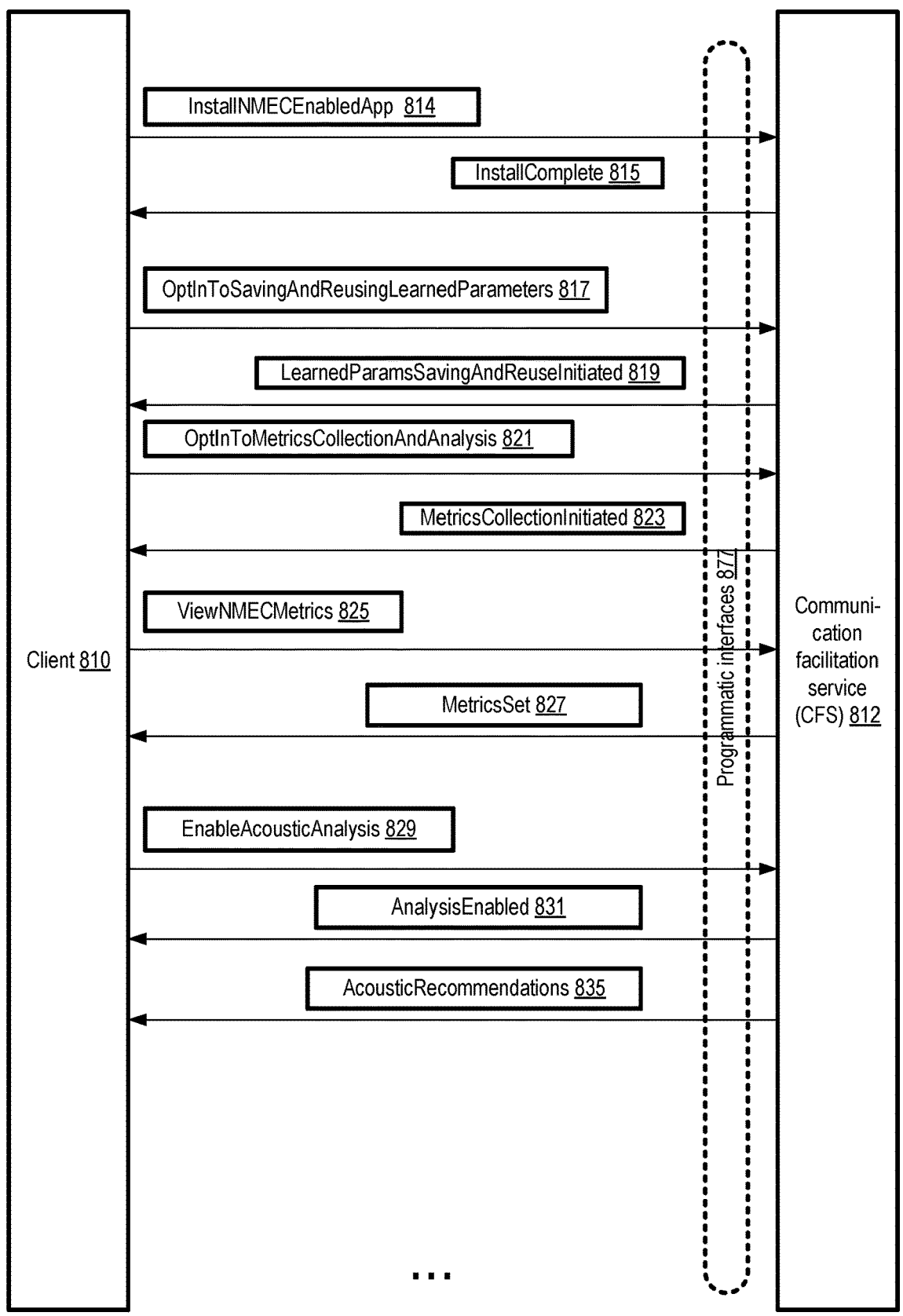
FIG. 8 illustrates example programmatic interactions between a client and a communication facilitation service which provides neural network-based multi-layer echo cancelers, according to at least some embodiments.

FIG. 8 illustrates example programmatic interactions between a client and a communication facilitation service which provides neural network-based multi-layer echo cancelers, according to at least some embodiments. In the embodiment shown in FIG. 8, NMECs may be designed and trained at a communication facilitation service (CFS) 812 similar in features and functionality to CFS 180 of FIG. 1, may implement a set of programmatic interfaces 877 in the depicted embodiment. Interfaces 877 may, for example, include a web-based console, command-line tools, graphical user interfaces and/or application programming interfaces (APIs) which can be used by CFS clients to submit request/ messages pertaining to the use of NMECs, and to receive corresponding responses.

A client 810 may submit an InstallNMECEnabledApp request 814 via programmatic interfaces to request the deployment of an application (such as a videoconferencing or audioconferencing application) which includes an NMEC at a client device in the depicted embodiment. The application may be transmitted and installed at the client device, and an InstallComplete message 815 may be sent to the client to indicate that the installation succeeded.

In some embodiments, the CFS may obtain permissions from a client before saving and re-using NMEC parameters learned using the client's devices in the manner outlined above in the context of FIG. 7. An OptInToSavingAndReusingLearnedParameters message 817 may be sent by a client 810 to grant such permissions if desired, and the CFS may transmit a LearnedParamsSavingAndReuseInitiated message 819 in response.

A client may grant the CFS permission to collect and analyze metrics from the client's NMEC-equipped devices in some embodiments, e.g., by submitting an OptIntToMetricsCollectionAndAnalysis message 821. The CFS may in turn respond by sending a MetricsCollectionInitiated message 823 to the client.

To obtain metrics collected from the client's NMECs, a client may submit a ViewNMECMetrics request 825 in some embodiments. As mentioned earlier, the client may provide parameters which can be used to filter the metrics in at least one embodiment, e.g., based on location of metrics collection and/or time of metrics collection. In response, one or more MetricsSet messages 827 comprising the collected metrics (which satisfy the parameters if any filtering parameters are included) may be sent to the client from the CFS.

In at least one embodiment, a client may wish to obtain recommendations regarding potential changes to local acoustics environments from the CFS. Such a client may submit an EnableAcousticAnalysis message 829 to the CFS via programmatic interfaces 877. The CFS may send an AnalysisEnabled message 831 to the client, and then begin analysis of information collected from the NMEC in the environments in which they are employed by the client. If and when the analysis enables the CFS to provide a recommendation to modify acoustic conditions at a communication environment, e.g., by moving ACDs or ARDs relative to one another, by muting one or more ARDs, etc., the CFS may provide such recommendations to the client via one or more AcousticRecommendations messages 835 in the depicted embodiment. Such recommendations may be developed in real time, e.g., based on analysis performed at the CFS during an early portion of a communication session, and provided as soon as they are developed in at least some embodiments.

Figure 9:
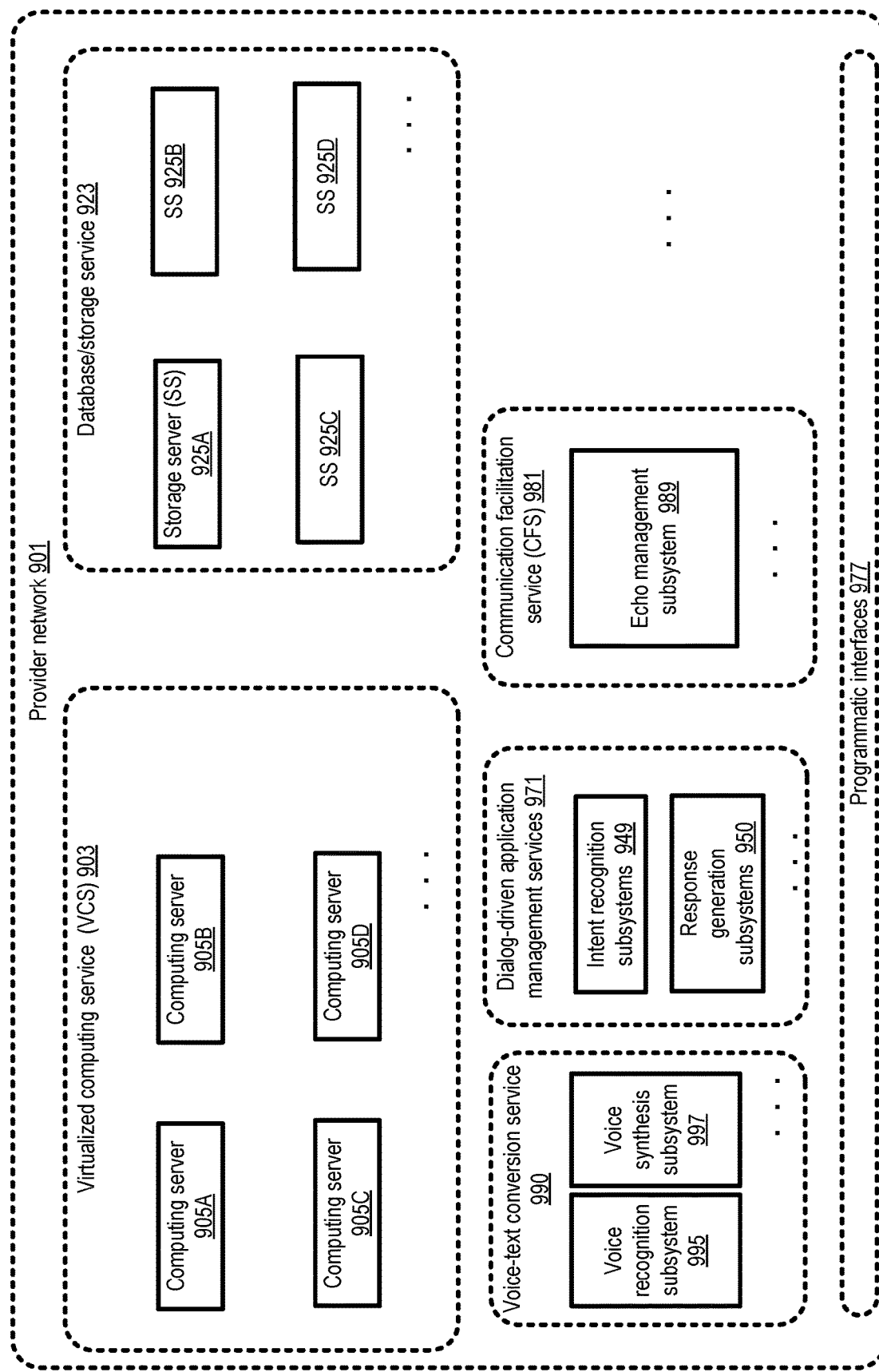
FIG. 9 illustrates an example provider network environment at which a communication facilitation service may be implemented, according to at least some embodiments.

FIG. 9 illustrates an example provider network environment at which a communication facilitation service may be implemented, according to at least some embodiments. In the depicted embodiment, provider network 901 may comprise resources used to implement a plurality of services, including for example a virtualized computing service (VCS) 903, a database/storage service 923, a voice-text conversion service 990, and a dialog-driven application management service 971 in addition to a communication facilitation service 981.

The voice-text conversion service 990 may comprise a voice recognition subsystem 995 and a voice synthesis subsystem 997 which utilize machine learning techniques to convert voice to text and text to voice respectively. At dialog-driven application management services 971, automated customer support applications or chatbot applications may utilize machine learning models to respond to dialog from a client. Intent recognition subsystems 949 may for example be designed to determine the intent (e.g., a desired service or product) corresponding to a portion of a customer's utterances or messages, while response generation subsystems 950 may prepare the responses to the customer. The CFS 981 may comprise an echo management subsystem 989 comprising components similar to the components of CFS 180 shown in FIG. 1. In at least one embodiment, CFS components such as NMEC parameter storage devices, NMEC metrics storage devices and NMEC execution servers may be distributed at locations external to the provider network's data centers, close to the communication environments at which the NMECs are used. Such locations may be referred to as edge locations of the provider network, and the CFS components at such locations may be referred to as edge devices.

Components of a given service may utilize components of other services in the depicted embodiment—e.g., for some computations, virtual machines implemented at computing servers such as 905A-905D of the virtualized computing service 903 may be used by the CFS, input data, metrics and/or output produced at models used at the voice-text conversion service and/or the dialog-driven application management service may be stored at storage servers 925 (e.g., 925A-925D) of storage service 923, and so on. Individual ones of the services shown in FIG. 9 may implement a respective set of programmatic interfaces 977 which can be used by external and/or internal clients (where the internal clients may comprise components of other services) in the depicted embodiment.

Figure 10:
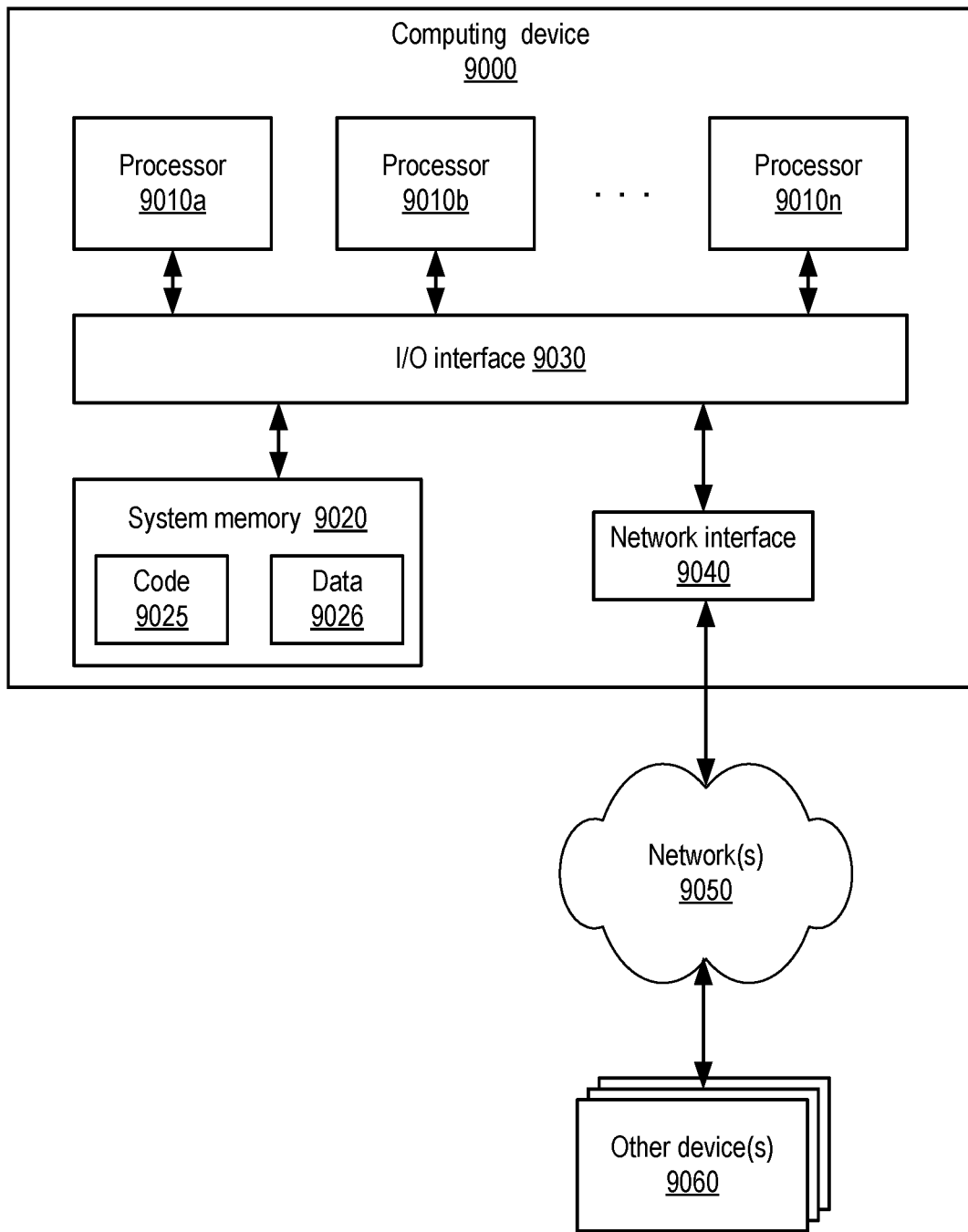
FIG. 10 is a block diagram illustrating an example computing device that may be used in at least some embodiments.

In at least some embodiments, a server that implements the types of techniques described herein (e.g., various functions of an CFS and other services of a provider network, as well as execution of an NMEC), may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 9. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   one or more computing devices;
   wherein the one or more computing devices include instructions that upon execution on or across the one or more computing devices:
      obtain, as input at a neural network-based multi-layer echo canceler comprising a first layer which includes a non-linear effects handler and a second layer which includes a linear effects handler, (a) output of a first microphone in a first communication environment comprising one or more microphones and one or more speakers, and (b) a reference signal received at the first communication environment from a second communication environment and directed to a first speaker of the one or more speakers;
      generate, at the non-linear effects handler, a first output obtained at least in part by applying a first learned compensation for a first set of properties of the output of the first microphone, wherein the first set of properties includes (a) a first non-linearity resulting from a clock skew between the first speaker and the first microphone, and (b) a second non-linearity in an audio reproduction capability of the first speaker, wherein applying the first learned compensation comprises modifying one or more weights of a first neural network based at least in part on processing of the reference signal and the output of the first microphone;
      provide, as input to the linear effects handler, at least the output of the non-linear effects handler;
      generate, at the linear effects handler, a second output obtained at least in part by applying a second learned compensation for a second set of properties of the output of the non-linear effects handler, wherein the second set of properties includes a first echo resulting from capturing audio output of the first speaker at the first microphone, and wherein applying the second learned compensation comprises utilizing, at a second neural network, a learned linear model of an acoustic path between the first speaker and the first microphone; and
      transmit the second output to the second communication environment.

2. The system as recited in claim 1, wherein the one or more computing devices include further instructions that upon execution on or across the one or more computing devices:
   run a video-conferencing application or an audio-conferencing application at the first communication environment, wherein the neural network-based multi-layer echo canceler is executed as part of the video-conferencing application or the audio-conferencing application.

3. The system as recited in claim 1, wherein at least one neural network of the first and second neural networks comprises a recurrent neural network.

4. The system as recited in claim 1, wherein an activation function of at least one neural network of the first and second neural networks is a complex activation function.

5. The system as recited in claim 1, wherein a learned weight of at least one neural network of the first and second neural networks is expressed as a complex number.

6. A computer-implemented method, comprising:
   generating, at a first layer of an echo canceler, a first output obtained at least in part by applying a first compensation for a first set of one or more properties of output of a first audio capture device of a first communication environment, wherein the first communication environment comprises a first audio rendering device configured to render audio obtained from a second communication environment, wherein the first set includes a property resulting from a difference in clock frequencies of the first audio rendering device and the first audio capture device, and wherein applying the first compensation comprises modifying one or more weights of a first neural network;
   generating, at a second layer of the echo canceler, a second output obtained at least in part by applying a second compensation for a second set of one or more properties of the first output, wherein the second set includes a first echo resulting from capturing audio output of the first audio rendering device at the first audio capture device, and wherein applying the second compensation comprises utilizing, at a second neural network, a linear model of an acoustic path between the first audio rendering device and the first audio rendering device; and
   transmitting the second output to the second communication environment.

7. The computer-implemented method as recited in claim 6, wherein at least one neural network of the first and second neural networks comprises a recurrent neural network.

8. The computer-implemented method as recited in claim 6, wherein at least one neural network of the first and second neural networks comprises one or more gated recurrent units (GRUs).

9. The computer-implemented method as recited in claim 6, wherein a learned weight of at least one neural network of the first and second neural networks is expressed as a complex number.

10. The computer-implemented method as recited in claim 6, wherein an activation function utilized at a neural network of the first and second neural networks comprises one of: (a) a cardioid function or (b) a siglog function.

11. The computer-implemented method as recited in claim 6, wherein a neural network of the first and second neural networks comprises a layer at which a convolution operation is performed with respect to a representation of a reference signal obtained from the second communication environment.

12. The computer-implemented method as recited in claim 6, wherein the first set of one or more properties for which a compensation is applied at the first layer includes a non-linearity in audio reproduction of the first audio rendering device.

13. The computer-implemented method as recited in claim 6, further comprising:
    executing a video-conferencing application or an audio-conferencing application at a computing device of the first communication environment, wherein the echo canceler is executed as part of the video-conferencing application or audio-conferencing the application.

14. The computer-implemented method as recited in claim 6, wherein the first audio capture device is incorporated within a voice-driven personal assistant device.

15. The computer-implemented method as recited in claim 6, further comprising:
    learning, using a first set of training data prior to a deployment of the echo canceler at the first communication environment, an initial set of parameters of the echo canceler;
    collecting, after deployment of the echo canceler at the first communication environment, a first convergence metric indicative of a time taken by the echo canceler to adapt the initial set of parameters to the first communication environment, wherein adapting the initial set of parameters results in a second set of parameters including at least one modified weight of a neural network of the first and second neural networks;
    collecting, after deployment of the echo canceler at a third communication environment, a second convergence metric indicative of a time taken by the echo canceler to adapt the second set of parameters to the third communication environment, wherein adapting the second set of parameters results in a third set of parameters including at least one neural network weight modified at the third communication environment; and
    providing, via a programmatic interface, the first and second convergence metrics.

16. One or more non-transitory computer-accessible storage media storing program instructions that when executed on or across one or more processors:
    generate, at a first layer of an echo canceler, a first output obtained at least in part by applying a first compensation for a first set of one or more properties of output of a first audio capture device of a first communication environment, wherein the first communication environment comprises a first audio rendering device configured to render audio obtained from a second communication environment, wherein the first set includes a property resulting from a difference in clock frequencies of the first audio rendering device and the first audio capture device, and wherein applying the first compensation comprises modifying one or more weights of a first neural network;
    generate, at a second layer of the echo canceler, a second output obtained at least in part by applying a second compensation for a second set of one or more properties of the first output, wherein the second set includes a first echo resulting from capturing audio output of the first audio rendering device at the first audio capture device, and wherein applying the second compensation comprises utilizing, at a second neural network, a linear model of an acoustic path between the first audio rendering device and the first audio rendering device; and
    cause the second output to be transmitted to the second communication environment.

17. The one or more non-transitory computer-accessible storage media as recited in claim 16, wherein at least one neural network of the first and second neural networks comprises a recurrent neural network.

18. The one or more non-transitory computer-accessible storage media as recited in claim 16, wherein a learned weight of at least one neural network of the first and second neural networks is expressed as a complex number.

19. The one or more non-transitory computer-accessible storage media as recited in claim 16, wherein the first set of one or more properties for which a compensation is applied at the first layer includes a non-linearity in audio reproduction of the first audio rendering device.

20. The one or more non-transitory computer-accessible storage media as recited in claim 16, storing further storing program instructions that when executed on or across the one or more processors:
    store, in persistent storage, one or more parameters learned at the echo canceler in the first communication environment during a first communication session, including a learned weight of the first neural network; and
    re-use, by the echo canceler, the one or more parameters during a second communication session.

* * * * *